United States Patent
Kalhan

(10) Patent No.: US 11,477,774 B2
(45) Date of Patent: Oct. 18, 2022

(54) CONTROL INFORMATION FOR DATA TRANSMISSIONS TO NARROWBAND (NB) DEVICE AND CO-LOCATED MOBILE BROADBAND (MBB) DEVICE USING COMMON COMMUNICATION RESOURCES

(71) Applicant: Kyocera Corporation, Kyoto (JP)

(72) Inventor: Amit Kalhan, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 158 days.

(21) Appl. No.: 16/754,700

(22) PCT Filed: Oct. 3, 2018

(86) PCT No.: PCT/US2018/054198
§ 371 (c)(1),
(2) Date: Apr. 8, 2020

(87) PCT Pub. No.: WO2019/083703
PCT Pub. Date: May 2, 2019

(65) Prior Publication Data
US 2020/0236660 A1  Jul. 23, 2020

Related U.S. Application Data

(60) Provisional application No. 62/578,159, filed on Oct. 27, 2017, provisional application No. 62/723,116, filed on Aug. 27, 2018.

(51) Int. Cl.
*H04W 72/04* (2009.01)
*H04B 7/0413* (2017.01)

(52) U.S. Cl.
CPC ........ *H04W 72/042* (2013.01); *H04B 7/0413* (2013.01)

(58) Field of Classification Search
CPC ....... H04W 4/06; H04W 48/10; H04W 48/12; H04W 48/16; H04W 72/0446;
(Continued)

(56) References Cited

U.S. PATENT DOCUMENTS 9,407,403 B2 * 8/2016 Yi ........................... H04L 5/005
10,536,946 B2 * 1/2020 Zhu ....................... H04W 40/20
(Continued)

FOREIGN PATENT DOCUMENTS

| WO | 2016018469 A1 | 2/2016 |
| WO | 2017098441 A1 | 6/2017 |
| WO | 2017171351 A2 | 10/2017 |

OTHER PUBLICATIONS

Sony; "Reserved resources for NR coexistence with eMTC," R1-1718661; 3GPP TSG RAN1 Meeting #90bis; Oct. 2, 2017; Prague, CZ.

*Primary Examiner* — Jason E Mattis

(57) ABSTRACT

A base station transmits a signal including mobile broadband (MBB) communication resources that contains mobile broadband (MBB) data for an MBB user equipment (UE) device and narrowband (NB) data for an NB UE device where the two devices are in the same geographical location. The time-frequency and spatial communication resources of the MBB communication resources are identified in control information directed to each device. The control information is transmitted to the MBB device over a MBB physical downlink control channel defined by a communication specification to have a first number of subcarriers. The control information is transmitted to the MBB device over a narrowband physical downlink control channel defined by the communication specification to have a second number of subcarriers less than the first number of subcarriers.

20 Claims, 10 Drawing Sheets

(58) Field of Classification Search
CPC ........... H04W 72/0453; H04W 72/085; H04W 72/048; H04W 72/042
USPC ....................................... 370/310, 328, 329
See application file for complete search history.

(56) References Cited

U.S. PATENT DOCUMENTS

| | | | |
|---|---|---|---|
| 10,547,402 B2* | 1/2020 | Li | H04W 72/085 |
| 10,560,304 B2* | 2/2020 | Lei | H04B 7/10 |
| 10,721,763 B2* | 7/2020 | Rico Alvarino | H04L 67/12 |
| 10,772,101 B2* | 9/2020 | Rong | H04W 76/11 |
| 10,939,314 B2* | 3/2021 | Thangarasa | H04L 1/1864 |
| 10,966,188 B2* | 3/2021 | Chang | H04L 5/00 |
| 11,006,444 B2* | 5/2021 | Yi | H04W 72/0413 |
| 11,083,003 B2* | 8/2021 | Xiong | H04L 5/0007 |
| 11,140,662 B2* | 10/2021 | Wong | H04L 5/0055 |
| 11,159,928 B2* | 10/2021 | Chatterjee | H04W 72/042 |
| 2013/0064197 A1 | 3/2013 | Novak et al. | |
| 2015/0334685 A1* | 11/2015 | Ji | H04W 72/1231 370/330 |
| 2019/0349136 A1* | 11/2019 | Kilinc | H04L 1/1819 |
| 2019/0387508 A1* | 12/2019 | Park | H04L 27/2607 |
| 2020/0008130 A1* | 1/2020 | Yavuz | H04W 48/16 |
| 2020/0037179 A1* | 1/2020 | Dalsgaard | H04W 72/048 |
| 2020/0044813 A1* | 2/2020 | Kalhan | H04L 5/0037 |
| 2020/0236660 A1* | 7/2020 | Kalhan | H04W 72/042 |
| 2020/0244412 A1* | 7/2020 | Kalhan | H04W 72/048 |
| 2020/0396728 A1* | 12/2020 | Zhu | H04W 72/044 |
| 2021/0007120 A1* | 1/2021 | Kalyanasundaram | H04B 7/0452 |

\* cited by examiner

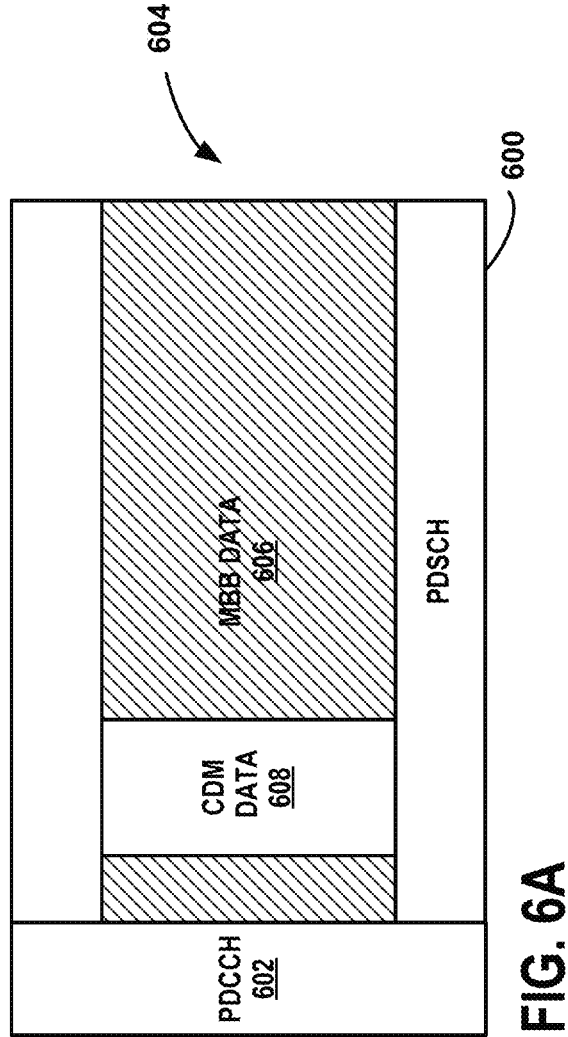
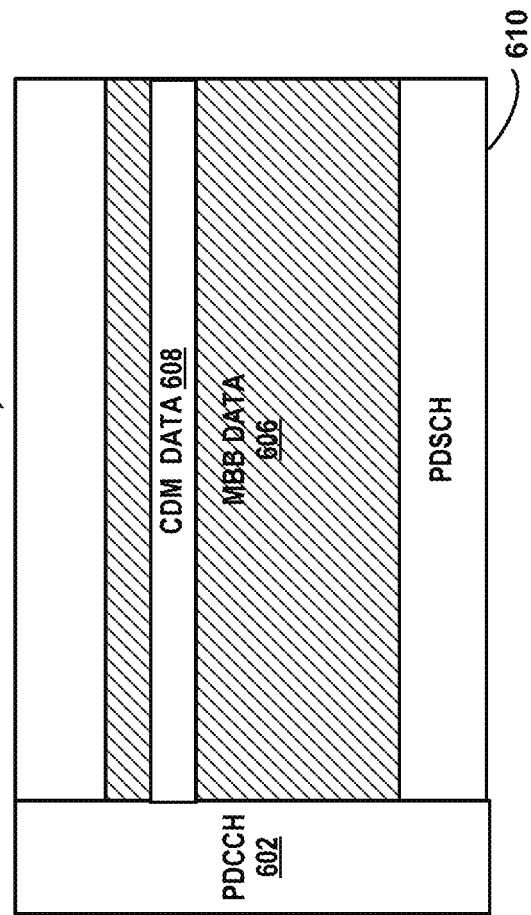
FIG. 6A
FIG. 6B

CONTROL INFORMATION FOR DATA TRANSMISSIONS TO NARROWBAND (NB) DEVICE AND CO-LOCATED MOBILE BROADBAND (MBB) DEVICE USING COMMON COMMUNICATION RESOURCES

CLAIM OF PRIORITY

The present application claims priority to U.S. Provisional Application No. 62/578,159 filed on Oct. 27, 2017, and U.S. Provisional Application No. 62/723,116 filed on Aug. 27, 2018, and assigned to the assignee hereof.

FIELD

This invention generally relates to wireless communications and more particularly to devices and methods for transmitting control information for data transmissions to a narrowband (NB) device and a co-located mobile broadband (MBB) device using common communication resources.

BACKGROUND

In conventional communication systems, base stations transmit signals to multiple devices within a service area where each device receives unique control information based on its specific geographical location. Some examples of control information that is dependent on the geographical location of the UE device include parameters related to multiple input multiple output (MIMO) antenna. In some situations, modulations coding scheme (MCS) parameters may also be the same.

Machine type communication (MTC) and narrow band Internet of Things (NB-IoT are forms of data communication which involve one or more entities that do not necessarily need human interaction. MTC and NB-IoT devices can be categorized as narrowband (NB) devices. Depending on the particular implementation, a NB device may communicate with one or more servers or with other devices. Typically, MTC is related to low-power wide-area network (LPWAN) type communications and NB-IoT is related to small devices connected to the Internet or each other (ad-hoc network). The network operator provides network connectivity to MTC or IoT server(s) regardless of whether the server is controlled by the network operator. An MTC device is typically a user equipment (UE) device that is equipped for Machine Type Communication and communicates through a public land mobile network (PLMN) with MTC Server(s) and/or other MTC Device(s). In some situations, an MTC device might also communicate locally through a hardwired or wireless connection with other entities.

Examples of NB-IOT include consumer products such as headsets, Google glasses and Facebook Oculus. On the other hand, MTC is more related to vending machines, meters, vehicle modems, and other similar devices.

MTC devices are increasingly being used in a variety of applications. Examples of some of the general areas of use include security, tracking, health, payment, remote diagnostics, metering and consumer electronics. Some of the many specific applications include surveillance system control, control of physical access (e.g. to buildings), fleet management, order management, asset tracking, navigation, traffic information, road tolling, point of sales, vending machines, gaming machines, vital signs monitoring, web access telemedicine points, remote maintenance and control of sensors, lighting, pumps, valves, and elevators, vehicle diagnostics, metering of power, gas, water and heating, grid control, and management and control of digital photo frames, cameras and eBooks.

NB-IoT and MTC devices can be categorized as narrowband (NB) devices since these types of devices generally use narrower bandwidth channels than other types of devices operating on a communication network. NB devices can operate on a mobile broadband (MBB) network which often operate in accordance with a communication specification. Therefore, both NB devices and MBB devices may be served by the same equipment within a communication network.

SUMMARY

A base station transmits a signal including mobile broadband (MBB) communication resources that contains mobile broadband (MBB) data for an MBB user equipment (UE) device and narrowband (NB) data for an NB UE device where the two devices are in the same geographical location. The time-frequency and spatial communication resources of the MBB communication resources are identified in control information directed to each device. The control information is transmitted to the MBB device over a MBB physical downlink control channel defined by a communication specification to have a first number of subcarriers. The control information is transmitted to the MBB device over a narrowband physical downlink control channel defined by the communication specification to have a second number of subcarriers less than the first number of subcarriers.

BRIEF DESCRIPTION OF THE DRAWINGS

FIG. 6A is a block diagram of the data layered signal using CDM where the NB data is overlaid on the MBB data using time division multiplexing (TDM), and FIG. 6B is a block diagram of a data layered signal using CDM where the NB data is overlaid on the MBB data using frequency division multiplexing (FDM).

DETAILED DESCRIPTION

Figure 1:
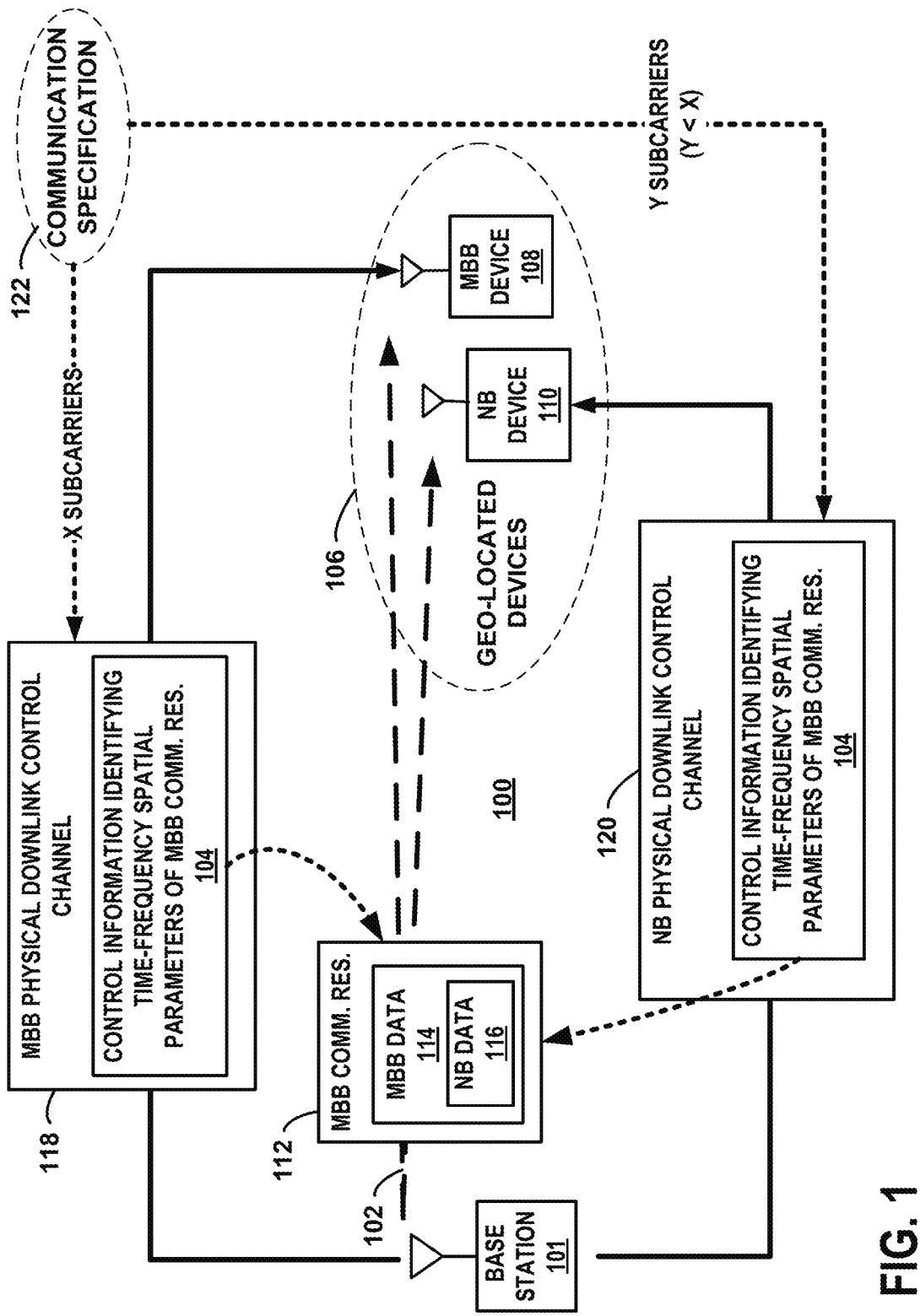
FIG. 1 is a block diagram of an example of a communication system where a base station transmits a data transmission and control information to a plurality of proximate devices including an MBB device and an NB device.

In certain situations, multiple user equipment (UE) devices may be positioned in close proximity to each other. Such situations may occur where the multiple devices are associated with the same user and may be being used at the same time. For example, a user may be watching a video on a smartphone and listening to the associated audio stream on a headset. In the recent years more and more users use multiple devices for different purposes. For example, a user carries a smartphone, a tablet and a smartwatch and each device has wireless connectivity. All these devices independently connect to the network to perform different functions. As the number of devices connected to the network increases the traffic-load increases as well as the management of these devices increases. In order to provide efficient wireless services to the multiple devices used by the same user there is a need to reduce the amount of spectrum-resources and control-signaling.

Scenarios where a user has multiple devices in the same location include situations where one UE device is a mobile broadband (MBB) UE device and one or more other devices are narrowband (NB) devices such as Machine Type Communication (MTC) devices or Internet of Things (IoT) devices. For example, a user may be receiving high definition video at a tablet using MBB service and may be receiving the associated audio at an MTC headset via NB service. Communication standards are evolving to more efficiently handle NB service to NB devices such as MTC and IoT devices. Some of the recent enhancement include defining a NB control channel for NB devices that includes fewer subcarriers than the conventional MBB control channels. For example, Rel-12 and Rel-13 of The Third Generation Partnership Project (3GPP) Long Term Evolution (LTE) specification have introduced an MTC-physical downlink control channel (MPDCCH) for MTC devices and a NB-IOT physical downlink control channel (NPDCCH) for NB-IoT communication. The MPDCCH and the NPDCCH are narrower versions of the conventional downlink control channel, PDCCH, used for MBB service.

The techniques discussed herein take advantage of the proximity of an NB user equipment (UE) device to an MBB UE device and a defined NB control channel by transmitting MBB data and NB data within the same set of time-frequency spatial communication resources and transmitting control information identifying those resources to the NB device in the NB control channel, such as MPDCCH or NPDCCH. In some situations, the MBB data and NB data shared the same time-frequency resources using data layering techniques such as layered modulation and code divisions multiplexing (CDM). In other situations, the NB data is "punctured" into the MBB data within the set of MBB communication resources by applying the NB data to unused time-frequency resources within the set of communication resources used for transmitting the MBB data.

For the examples discussed below, the same control information identifying the set of MBB communication resources conveying the MBB data and the NB data is transmitted in the MBB control channel (e.g., PDCCH) and in the NB control channel (e.g., MPDCCH, NPDCCH). In some situation, additional control information may be transmitted to one or more devices that identifies the data layering parameters or data puncturing scheme. In other situations, however, the devices are able to extract the appropriate data without additional information. In one example, a finite set of data layering parameters are used allowing the devices to determine the parameters by attempting different schemes.

Therefore, multiple UE devices receive the same data signal and the same control message but recover only the data intended for the device. As a result, communication resources are efficiently utilized since the same time, frequency and spatial communication resources are used to transmit data to all of the UE devices while transmitting control information within the narrower NB control message to the NB device. In some situations, feedback information from only one of the devices may be applied to setting transmission, modulation, coding rate, and timing parameters for the transmission. For example, feedback related to timing alignment (TA) may be received at the base station from one device and assumed to be accurate for other proximate devices receiving the common set of time-frequency communication resources from the base station.

FIG. 1 is a block diagram of an example of a communication system 100 where a base station 101 transmits a data transmission 102 and control information 104 to a plurality of proximate devices 106 including an MBB device 108 and an NB device 110. The data transmission 102 shares a set of time-frequency and spatial MBB communication resources 112 to send MBB data 114 to the MBB device 108 and NB data 116 to the NB device 110 that is geographically located near the MBB device 108. Control information 104 that identifies the time-frequency spatial parameters of the set of MBB communication resources 112 is transmitted to the MBB device 108 over a MBB downlink control channel 118 and transmitted to the NB device 110 over a NB downlink control channel 120. Therefore, the same control information 104 is transmitted to both devices through different control channels 118, 120. The data and control channels are defined by a communication specification 122. For the examples herein, the communication specification 122 defines the MBB physical downlink control channel 118 to have a particular frequency bandwidth and the NB physical downlink channel 120 to have another, narrower frequency bandwidth. For the examples herein, the communication system 100 uses orthogonal frequency division multiplexing (OFDM) where a carrier is divided into several subcarriers and each subcarrier is divided in time to define several time-frequency communication resources. The time-frequency resources may be organized into time slots and resource blocks. Since the subcarriers have the same width or subcarrier spacing (SCS), the NB physical downlink channel 120 is defined by the communication specification to have fewer subcarriers than the wider MBB physical downlink channel 118.

Although the techniques described herein may be applied to systems operating in accordance with other communication specifications, the examples herein operate in accordance with at least one revision of The Third Generation Partnership Project (3GPP) Long Term Evolution (LTE) communication specification such as, for example, the Rel-12 and Rel-13 revisions. The techniques may be applied to future revisions such as those developed for 3GPP 5G communication specifications. In accordance with at least some revisions of the 3GPP communication specification, as discussed above, NB physical downlink control channels have been defined for MTC devices and NB-IoT devices. More specifically, the MPDCCH has been defined for MTC devices and NPDCCH has been defined for NB-IoT devices. Therefore, for the examples herein, the NB physical downlink control channel 120 may be the MPDCCH or NPDCCH depending on the particular NB device 110 and circumstance.

The control information identifies the set of MBB communication resources 112 where the MBB data 114 and the NB data 116 can be found. In order that both sets of data be conveyed by the same set of communication resources, the two data sets either share the same specific time-frequency resources in the set or the NB data is applied to specific time-frequency resources not used by the MBB data. The smallest defined unit which consists of one OFDM subcarrier during one OFDM symbol interval is often referred to as a Resource Element (RE). Therefore, the two data sets may share resources elements or the NB data may use resource elements not occupied by MBB data. In situations where resource elements are shared by the data, layered modulation or code division multiplexing (CDM) techniques can be used to layer the data. Where the data is layered, the base station 101 arranges the data on the layered data signal such that MBB data 114 directed to the MBB device 108 is transmitted within a first data layer of the signal and NB data 114 directed to a NB device 110 is transmitted within a second data layer of the signal. Although the data layering may be applied using any of several techniques, two examples discussed herein include applying layered modulation to the data and applying code division multiplexing (CDM) to the data. The base station 101 also sends the control messages that include the control information regarding reception of the data layered signal at the UE devices 108, 110. The control messages include a common geographical location dependent control information and data location information regarding identifying the set of communication resources. In some situations, a data layer information field may be included for each device. The control information 104, therefore, allows each device to receive the data directed to it. Since the two devices are close to each other, the information includes common geographical location dependent control information. The common geographical location dependent control information is control information that results, or is otherwise dependent on, the location of the UE devices 108, 110. Examples of common geographical location dependent control information include MIMO settings Precoding Matrix Index (PMI), PMI Confirmation bit, Power Offset between PDSCH and RS, DM-RS Scrambling Sequence Index, Number of Layers, and Phase-tracking RS Sequence Index. The proximate devices are close enough to each such that the common control information such as spatial vectors and MIMO parameters are at least similar and, in some situations, the same. In some circumstances, the devices may be within one foot from each other. In other circumstances, the distance between the devices is less than two feet. In still other circumstances, the devices are less than three feet from each other. Other distances between the devices may also be possible depending on the particular system implementation and channel conditions.

As mentioned above, the control messages may also include data layering information that is arranged in data layering information fields associated with each UE device 108, 110. In situations where the data is layered using layered modulation, the data layer information fields may include modulation coding scheme (MCS), redundancy version (RV), new data indicator (NDI), and data sequence information for each data stream. Where CDM is used for the data layering, the data layering information fields may include CDM codes, for example. Any layering information may include an indication of whether the data is assigned to the LSB or the MSBs of the modulated symbols. Where CDM is used for data layering the data layering information may include multiplexing codes for each device in each field. The control messages can include any number of data layering information parameters and fields depending on the particular situation. In some situations, the NB data may be in a predetermined format that is known to the NB device. As a result, any NB data layer control information may include only limited information formation. In one example, the NB data layer control information includes only a layered data indicator indicating that the NB data is overlaid on a portion of data subcarriers conveying UE data. The NB data layering information field, therefore, may include a one-bit flag that indicates whether there is layered NB data. The predetermined format may include a modulation coding scheme (MCS), a size of the NB data, and a time-frequency resources of the NB data overlaid on the portion of data subcarriers. In situations the predetermined format may also include common spatial resources of the UE data and the NB data. For the examples herein, the control information does not include any data layering information and the devices 108, 110 determine the data layering parameters by attempting reception using different parameters. In some situations, only a finite set of parameters are used thereby providing a limited number of data layering options.

Figure 2A:
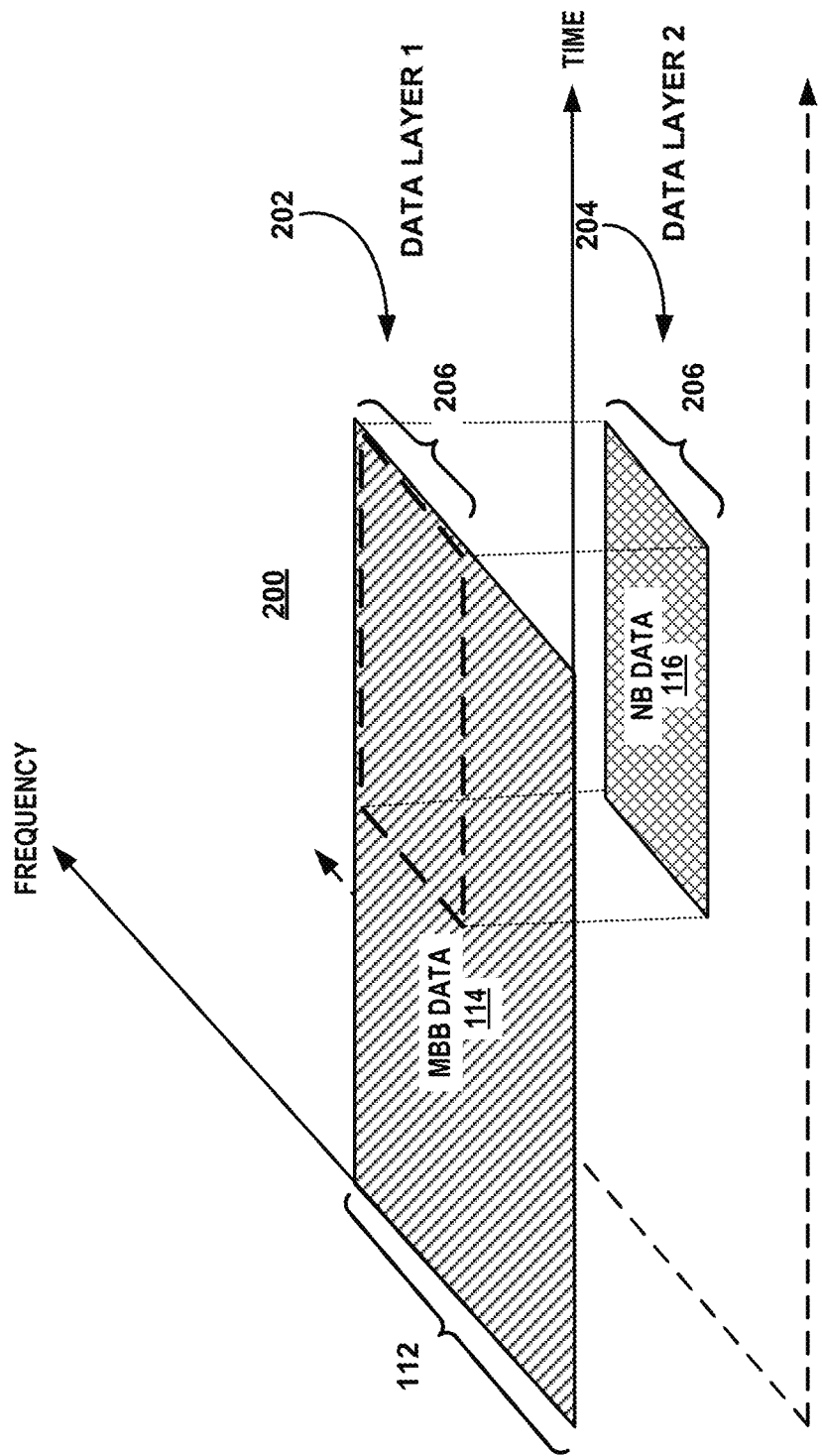
FIG. 2A is an illustration of an example of a set of communication resources conveying MBB data and NB data in a an MBB data channel using layered modulation

FIG. 2A is an illustration of an example of a set of communication resources 112 conveying MBB data 114 and NB data 116 in a an MBB data channel 200 using layered modulation. Since the downlink transmissions from the base station 101 are also divided spatially, the set of communication resources 112 have time-frequency and spatial parameters. The MBB data 114 is transmitted on a first layer 202 of the set of communication resources 112 and the NB data 116 is transmitted on a second layer 204 of the set of communication resources 112. For the example of FIG. 2A, the NB data 116 only uses a portion 206 of the set of communication resources 112. In some situations, the entire set of communication resources 112 can be used for NB data 116.

Figure 2B:
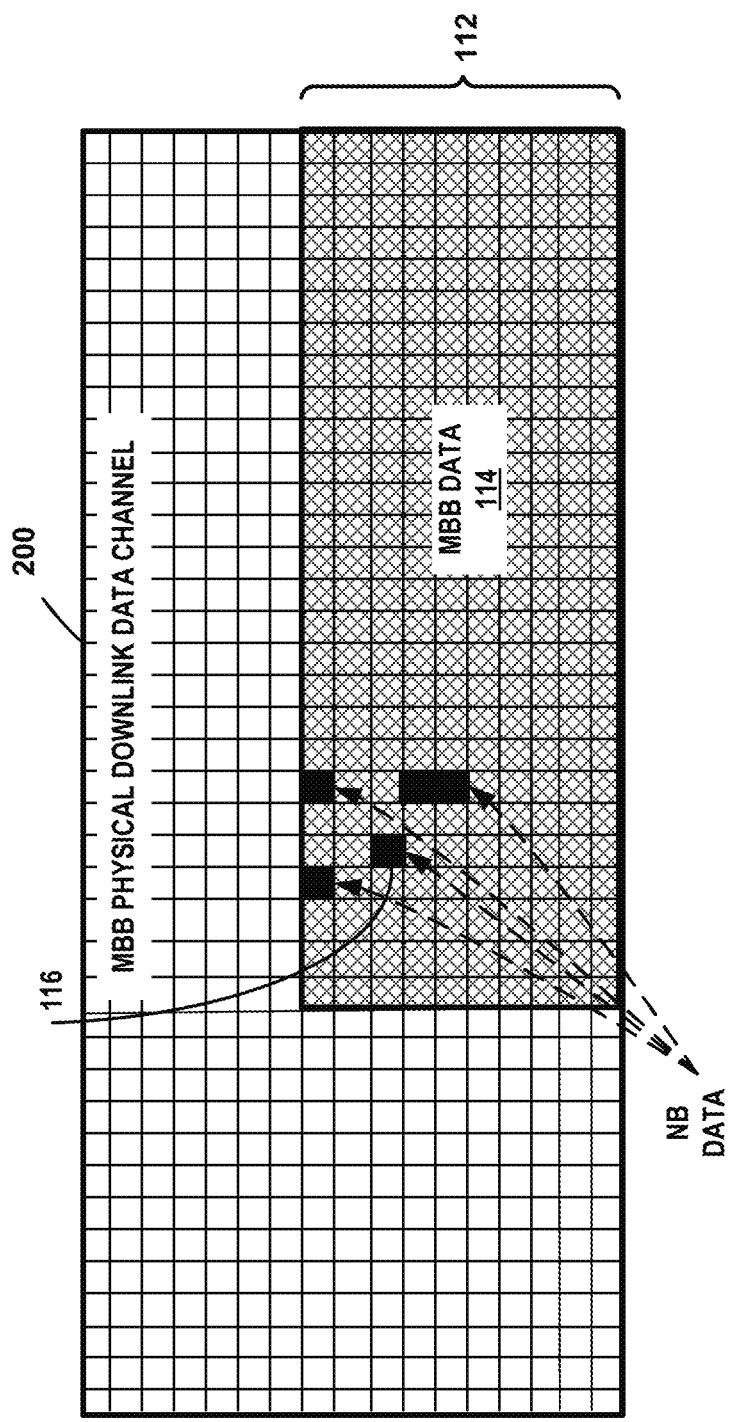
FIG. 2B is an illustration of an example of a set of communication resources conveying MBB data and NB data in a an MBB data channel using data puncturing.

FIG. 2B is an illustration of an example of a set of communication resources 112 conveying MBB data 114 and NB data 116 in a an MBB data channel 200 using data puncturing. In FIG. 2B, the MBB data is illustrated as double crosshatched blocks and the NB data 116 is shown as solid black blocks. The NB data 116 occupies communication resources that are not used by the MBB data 114. The resources elements used for the NB data 116 may be adjacent to each other to form continuous blocks of data or may be disbursed within the MBB data 114.

Figure 3:
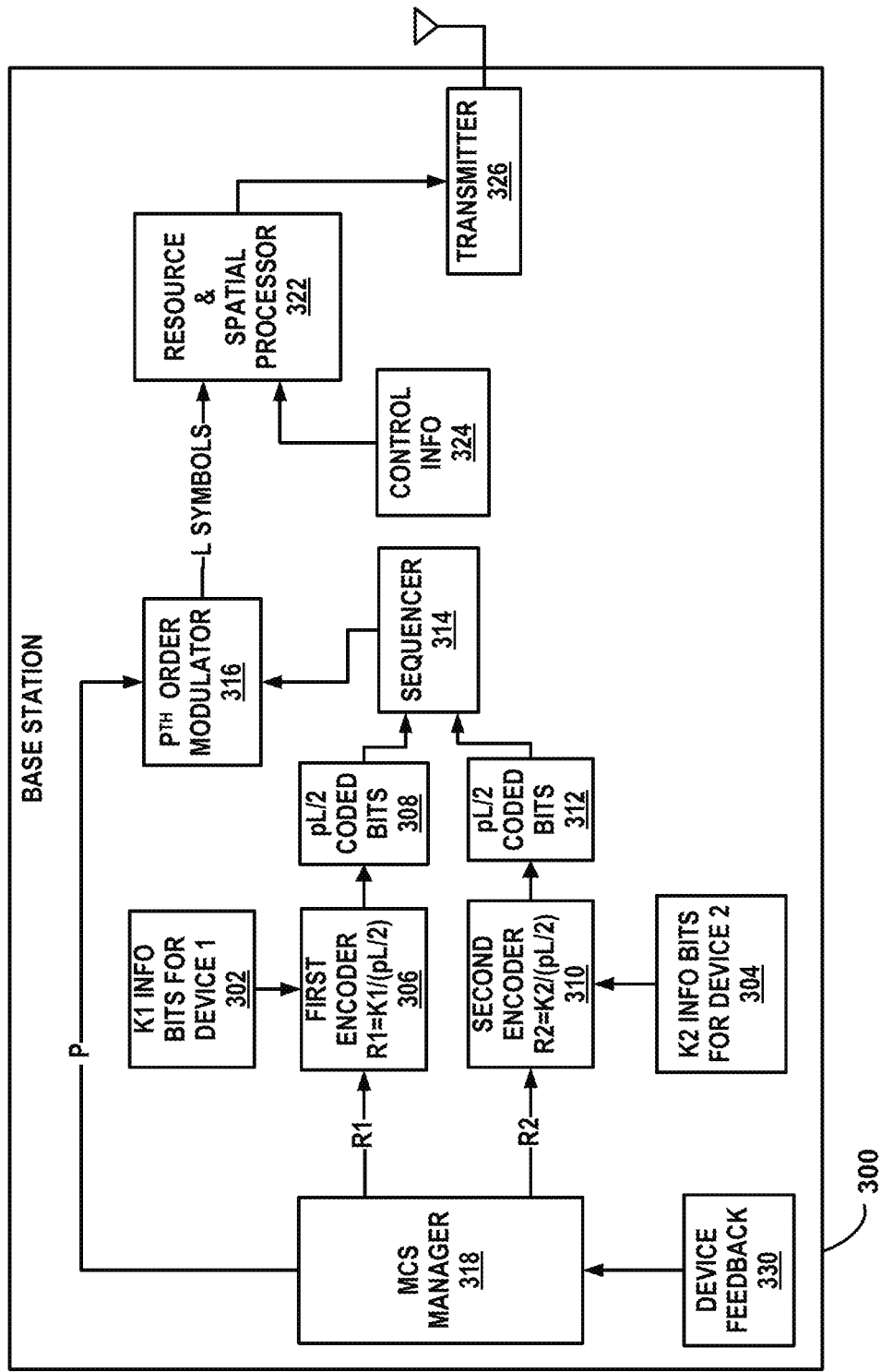
FIG. 3 is a block diagram of a base station for an example where the data layering technique includes layered modulation.

FIG. 3 is a block diagram of a base station for an example where the data layering technique includes layered modulation. Accordingly, the base station 300 of FIG. 3 is an example of the base station 101 in the example of FIG. 1. The base station 300 separately encodes the data for each device and modulates the encoded data to generate the layered modulation signal that is transmitted to both devices. For the example of FIG. 3, the base station 300 is an eNB, eNodeB, gNodeB, access point, transceiver station, radio head, or any other device performing similar tasks in a system otherwise operating in accordance with a revision of a 3GPP communication specification. The various functions and operations of the blocks described with reference to the base station 300 may be implemented in any number of devices, circuits, electronics, code, or elements. Two or more of the functional blocks may be integrated in a single device, and the functions described as performed in any single block may be implemented over several devices. For example, the functions of the two encoders 306, 310 in the base station 300 may be performed by a single device able to apply different coding rates to different sets of bits. Also, the functions of the encoders 306, 310 and sequencer 314 may be performed by a single signal processing device in some circumstances.

MBB data 302 intended for the MBB UE device 108 includes K1 number of information bits. NB data 304 intended for the NB device 110 includes K2 number of information bits. The MBB data information bits 302 are coded by a first encoder 306 having a first coding rate (R1) to generate a first set of coded bits 308. The NB data information bits 304 are coded by a second encoder 310 having a second coding rate (R2) to generate a second set of coded bits 312. A sequencer 314 combines the bits from the first set of coded bits 308 and from the second set of coded bits 312 in a sequence of bits that is modulated by the modulator 316. The sequence of bits includes an equal number of first coded bits 308 and second coded bits 312 in the example. The modulator 316 is a $p^{th}$ order modulator that applies layered modulation to the sequence of coded bits. A MCS manager 318 determines the coding rates and modulation order at least partially based on feedback 320 from one of the UE devices 108, 110. The MCS manager 316 evaluates the required quality of service (QoS) and channel conditions to determine the appropriate modulation order and coding rates. For the example, only one of the UE devices provides feedback 320 regarding reception of signals transmitted by the base station 320. Since the UE devices 108, 110 are near each other, it is assumed that the feedback from one device is similar to feedback that would have provided by another device. In some circumstances, however, feedback 320 may be provided by multiple UE devices even though they are positioned close to each other. Examples of device feedback include parameters related to channel conditions and timing. Also, in other situations, feedback may not be required for NB-IoT devices where a fixed set of MCS is used for transmission.

The L symbols generated by the modulator 316 are processed by a resource and spatial processor 322 before being transmitted by the transmitter. Control information 324 including the control message is also processed by the processor 322 before transmission. Resource mappings includes assigning timeslots and subcarriers to be used for the transmission. Spatial processing includes applying the spatial coefficients based on the MIMO parameters to the signal before transmission. For example, a beamforming vector (precoding) can be applied to the transmission signal. The control information may have the same spatial processing parameters as the transmission signal.

A transmitter 326 transmits a layered modulated signal including the MBB data and NB data within the service area, or sector of the service area, of the base station 300. For the example, the coding rates, K1, and K2 are selected such that the number (K1) of coded bits 308 in the first set is equal to the number (K2) of coded bits 312 in the second set. If L is the total number of modulated symbols generated in the data layered signal, the number of coded bits in the first set of coded bits and the number of coded bits in the second set of coded bits is equal to pL/2 where p is the modulation order of the modulator 316. The coding rate of the first encoder is R1 and the coding date of the second encoder is R2 where R1=K1/(pL/2) and R2=K2/(pL/2).

For the example of FIG. 3, the layered modulation results from the sequencing of the encoded bits such that the MBB data 114 is represented by the most significant bits (MSB) in the modulated symbol and the NB data 116 is presented by the least significant bits (LSB) in the modulated symbol. The sequencer 314 applies the coded bits from the first encoder 306 as the most significant bits of the symbol and applies coded bits from the second encoder 310 to the least significant bits of the symbol. In some situations, the sequences of coded bits are predetermined and static. In other circumstances, however, the sequence of the bits in the MBB resource transmission 112 is dynamically changing or otherwise not known by the UE devices 108, 110. As a result, the base station 300 may provide the sequence to the UE devices 108, 110 as part of the control information. Where the sequence is known to the UE devices, the sequence information is not transmitted. For example, if the sequence includes using the most significant bits from one encoder and the least significant bits from a second encoder and the devices 108, 110 are aware of the assignment, the sequence information may not need to be transmitted to the UE devices.

Typically, a base station provides Modulation and Coding Scheme (MCS) configuration information to UE devices. For the examples herein, the base station 300 provides the MCS information for both coding rates. As a result, the base station transmits MCS1 and MCS2. The receiver decodes the control channel and accordingly demodulates/decodes the associated data streams. As discussed above with reference to FIG. 1, the control information includes information identifying the time, frequency, and spatial parameters of the MBB communication resources. The control information may also include specific control information related to the data layers that is unique to each UE device. For the example of FIG. 3, the control information includes the MCS for the MBB data, the MCS for the NB data, sequence information indicating LSB or MSB for the MBB data, sequence information indicating LSB or MSB for the NB data, RV and NDI for the MBB data, RV and NDI for the NB data, data location in the signal (which is the same for the MBB data and the NB data), and MIMO Transmission Mode and parameters needed for spatial processing (which is the same for the MBB data and the NB data). Additional parameters regarding the modulation layers may also be provided for each of the MBB data and the NB data. For example, where superposition transmission techniques discussed in section 5 of 3GPP TR 36.859 v13.0.0, December 2015 are used, amplitude-weight ($\sqrt{\alpha}$) may be provided. In some situations, additional information may be provided in the control information. For example, the relationship between the MBB data and the NB data may be provided. Such information may include, for example, a block number of the audio stream matching to data block number of the video stream for data buffering at each device where one device provides video to a user and the other device is providing audio.

Figure 4:
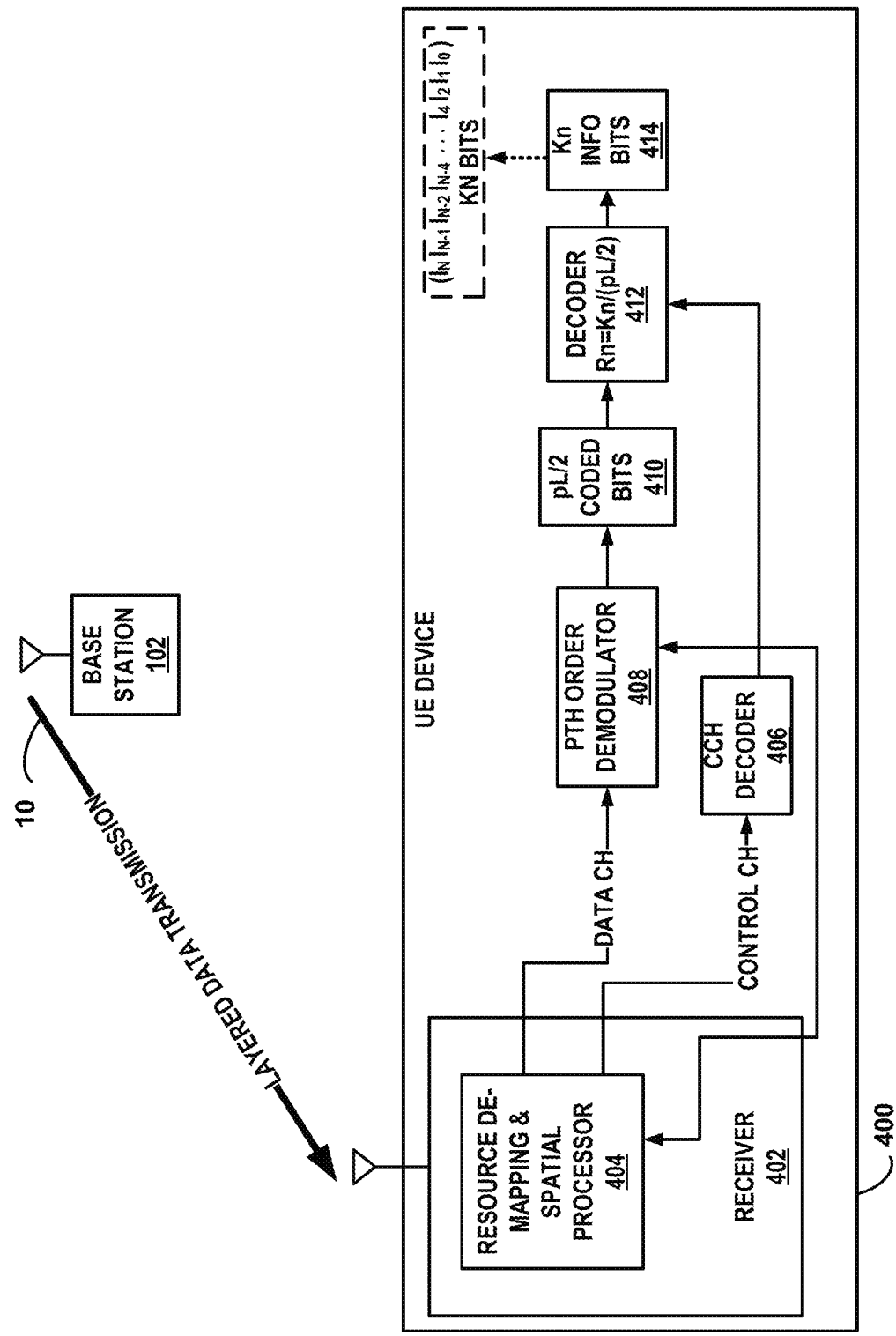
FIG. 4 is a block diagram of a UE device for an example where the layered data signal is a layered modulation signal.

FIG. 4 is a block diagram of a UE device 400 for an example where the layered data signal is a layered modulation signal. Accordingly, the UE device 400 is an example of a UE device suitable for uses as the MBB UE device 108 and the NB UE device 110 for the example discussed with reference to FIG. 3. The various functions and operations of the blocks described with reference to the UE device 400 may be implemented in any number of devices, circuits, electronics, code, or elements. Two or more of the functional blocks may be integrated in a single device, and the functions described as performed in any single block may be implemented over several devices. For example, the functions of the receiver 402, the demodulator 404 as well as other spatial processing and de-mapping functions 404 may be performed by a single receiver apparatus in some circumstances.

The receiver 402 receives the data layered signal 104 from the base station 101 (300). A resource de-mapping and spatial processor 404 performs spatial processing and de-mapping. For the example, the receiver 402 applies MIMO parameters to perform spatial processing based on the control information. For an MBB UE device, resource de-mapping separates the control channel from the data channel (PDCCH and PDSCH) time/frequency resources. After decoding the PDCCH, the receiver 402 determines the exact PDSCH time/frequency resources to extract the data bits before demodulation and decoding. Where the UE device is a NB device, resource de-mapping separates the control channel from the data channel (MPDCCH and PDSCH) time/frequency resources. After decoding the MPDCCH, the receiver 402 determines the exact PDSCH time/frequency resources to extract the data bits before demodulation and decoding.

The control message including the control information is decoded by a control channel decoder 406 and the data channel portion of the signal is demodulated by the demodulator 408. The control channel decoder 406 determines the contents of the control information regarding modulation order and the data layering parameters assigned to the UE device 400, if they are transmitted. In some situations, information regarding the data layering is not transmitted. This may be because the UE device already has the information or because here are a finite number of possible layered modulation possibilities allowing the UE device to attempt reception of the signal using the different possibilities. For example, the overlaying of NB data could be fixed and the NB device could be aware of it either by design or by higher layer RRC messaging and/or SIB.

The demodulator 408 applies the modulation order parameters determined by the control channel decoder (or by successful reception attempts) to generate the sequence of coded bits 410 that includes the coded bits 308 and the coded bits 312. The decoder 412 recovers the data directed to the UE device 400 in accordance with data layering information that is retrieved by the control channel decoder 406 or that has through an attempt process.

As mentioned above, NB UE devices such as MTC and NB-IoT devices are increasingly being used for numerous applications where the NB devices exchange information with other devices and servers. The network facilitating communication with the NB devices must handle the increased traffic due to the numerous NB devices while accommodating the particular requirements and limitations of the NB devices. At the same time, users are increasingly operating a greater number of devices where at least some of the devices utilize NB communication for MTC and NB-IoT. Communication specifications are evolving to facilitate more efficient NB communication. Revisions of the 3GPP specification, for example, have introduced narrower control channels for NB devices. As a result, the proximity of NB devices associated with the same user provides an opportunity to apply the techniques discussed herein to more efficiently utilize communication resources. In addition to utilizing the NB control channels for control information to NB devices, the data layering techniques use the same time-frequency-spatial resources to service multiple devices.

Figure 5:
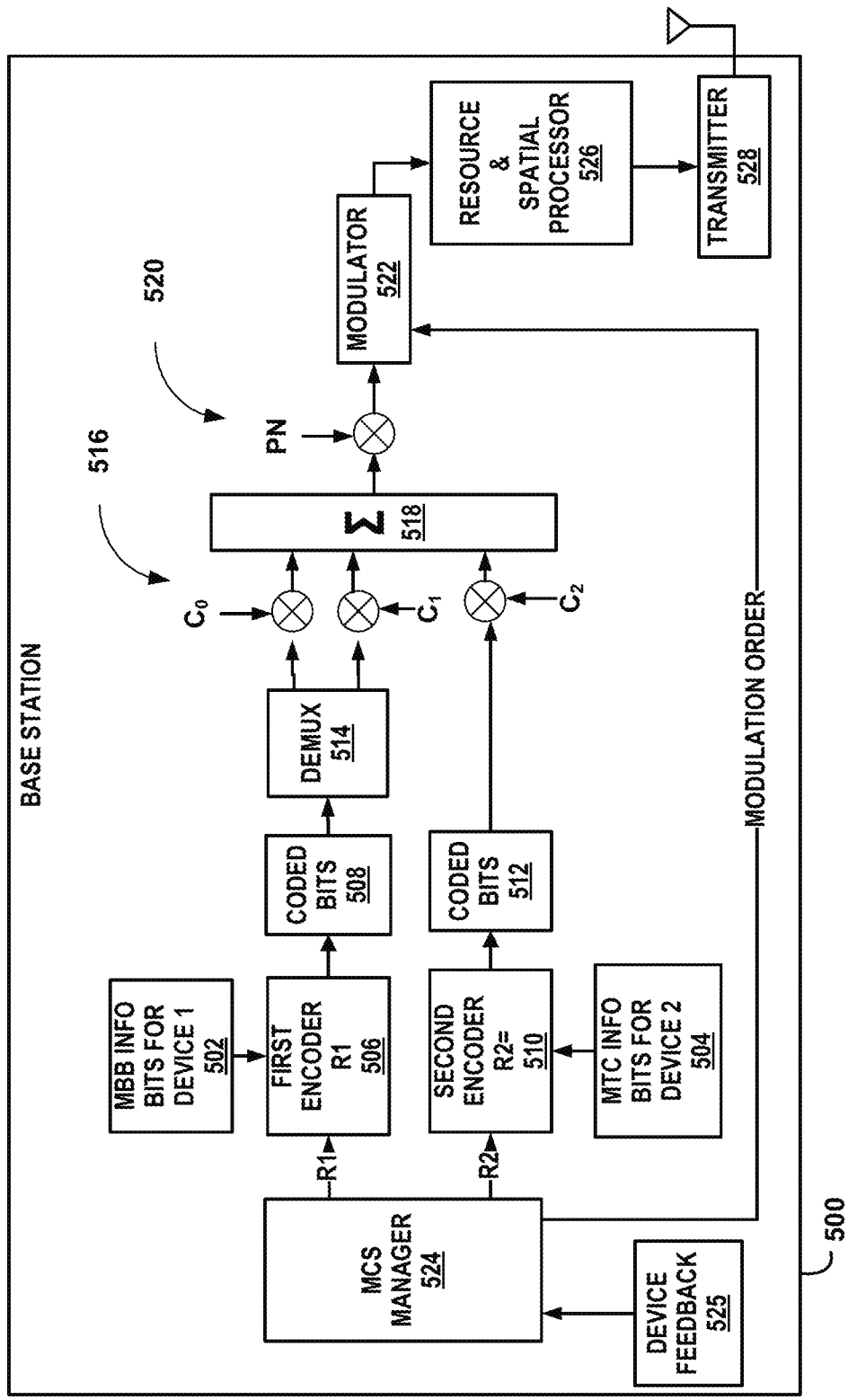
FIG. 5 is a block diagram of a base station for an example where the data layering technique includes code division multiplexing (CDM).

FIG. 5 is a block diagram of a base station 500 for an example where the data layering technique includes code division multiplexing (CDM). Accordingly, the base station 500 of FIG. 5 is an example of the base station 101 in the example of FIG. 1. The base station 500 separately encodes the data for each device and separately modulates each set of encoded data to generate before the modulated data is code division multiplexed with orthogonal codes. The CDM signals are further processed before transmission to the devices. For the example of FIG. 5, the base station 500 is an eNB, eNodeB, gNodeB, transceiver station, radio head, access point, or any other device performing similar tasks in a system otherwise operating in accordance with a revision of a 3GPP communication specification. The various functions and operations of the blocks described with reference to the base station 500 may be implemented in any number of devices, circuits, electronics, code, or elements. Two or more of the functional blocks may be integrated in a single device, and the functions described as performed in any single block may be implemented over several devices. For example, the functions of the two encoders 506, 510 in the base station 500 may be performed by a single device able to apply different coding rates to different sets of bits.

For the example of FIG. 5, the MBB UE device 108 is a UE device utilizing mobile broadband (MBB) and the NB UE device 110 is an MTC UE device or NB-IoT UE device. In one situation, the MBB UE device is a smartphone and the NB UE device is an NB-IoT headset.

MBB data 502 intended for the MBB UE device 108 includes MBB information bits. NB data 504 intended for the NB UE device 110 includes NB information bits. The MBB data information bits 502 are coded by a first encoder 506 having a first coding rate (R1) to generate a first set of coded bits 508. The NB data information bits 504 are coded by a second encoder 510 having a second coding rate (R2) to generate a second set of coded bits 512. The first coded bits 508 are demultiplexed in a demultiplexer 514 to generate two streams where each stream is spread with a CDM code ($C_0$, $C_1$) by a code division multiplexer 516. The code division multiplexer 516 is configured to apply code division multiplexing (CDM) to the MBB data and to the NB data to generate the first data layer and the second data layer. For the example, the MBB data signal is separated into two streams where one stream is spread with CDM code $C_0$ and the other is spread with code $C_1$. The MTC coded bits 512 are spread with another CDM code ($C_2$). The CDM codes ($C_0$, $C_1$, $C_2$) are orthogonal for the example. The CDM spread data streams are combined in the combiner 518 before a pseudo random (PN) sequence is applied to the combined signal by a mod 2 multiplier 520. The PN sequence (unlike the Walsh codes) is typically formed by an M-sequence. An m-sequence has excellent circular autocorrelation property where the cross-correlation of the m-sequence with any delayed version of the same m-sequence will result in a very low cross-correlation value (i.e., minimal interference). Therefore, signals meant for the MBB device will be much smaller when received by the NB device.

A modulator 522 modulates the signal generated by the mod 2 multiplier 520 using the modulator order provided by a MCS manager 524. The MCS manager 524 determines the coding rates and modulation order at least partially based on feedback 525 from one of the UE devices. The MCS manager 524 evaluates the required quality of service (QoS) and channel conditions to determine the appropriate modulation order and coding rates. For the example, only one of the UE devices provides feedback 525 regarding reception of signals transmitted by the base station 500. Since the UE devices 108, 110 are near each other, it is assumed that the feedback from one device is similar to feedback that would have provided by another device. In some circumstances, however, feedback 525 may be provided by multiple UE devices even though they are positioned close to each other.

Examples of device feedback include parameters related to channel conditions and timing.

The modulated signal is further processed by a resource and spatial processor 526. The processor 526 applies spatial processing and resource mapping. Resource mapping includes assigning timeslots and subcarriers to be used for the transmission. Spatial processing includes applying the spatial coefficients based on the MIMO parameters to the signal before transmission. For example, a beamforming vector can be applied to the transmission signal.

A transmitter 528 transmits the data layered signal using the MBB communication resources within the service area, or sector of the service area, of the base station 500. For the examples of FIG. 5, the control information identifies the CDM codes ($C_0$, $C_1$, $C_2$) used for spreading the coded bits. In some situations, the codes can be omitted from the control information and the UE devices can determine the which code, from a fixed number of possible codes, is the appropriate code through data retrieval attempts. Also, for the example, the transmitter 528 is an OFDM transmitter. Other types of related transmission technologies may be used to transmit the signal such as for example, Filter Bank Multi-carrier (FBMC) techniques.

Typically, a base station provides Modulation and Coding Scheme (MCS) configuration information to UE devices. For the examples herein, the base station 500 provides the MCS information for both coding rates. As a result, the base station transmits MCS1 and MCS2. The receiver decodes the control channel and accordingly demodulates/decodes the associated data streams. As discussed above with reference to FIG. 1, the control information identifies MBB communication resources conveying the MBB data and the NB data and may include spatial, time, and frequency parameters. For the example of FIG. 5, the control information includes the MCS for the MBB data, the MCS for the NB data, RV and NDI for the MBB data, RV and NDI for the NB data, Hybrid-HARQ parameters for the MBB data and Hybrid-HARQ parameters for the NB data, data location in the signal (which is the same for the MBB data and the NB data), and MIMO and Transmission Mode parameters needed for spatial processing (which is the same for the MBB data and the NB data). The time, frequency and spatial parameters are the same for both devices. In most situations, MCS are not needed for an NB-IoT device if it is fixed. Information for RV, NDI, and HARQ is typically different or each device. In some situations, additional information may be provided in the control information. For example, the relationship between the MBB data and the NB data may be provided. Such information may include, for example, a block number of the audio stream matching to data block number of the video stream for data buffering at each device where one device provides video to a user and the other device is providing audio.

Therefore, CDM data layered transmission allows NB control information to be transmitted in a narrower control channel and a single resource allocation to deliver the two data streams to two devices that are in close proximity to each other. Generally, the use of CDM allows simultaneous use of the resources (spectrum) for multiple devices at the expense of reduced data rate. The extent of the data rate reduction depends on the length of the PN sequence (e.g., m-sequence). The longer the spreading code, the larger the data rate reduction while the spreading gain increases. The CDM data layering technique, however, allows the network to bias the data rate among the supported devices by allocating one or more CDM codes (e.g., Walsh codes) to specific devices based on application or device type. In particular, depending on the required data rate for each of the devices, the network may vary the number of CDM codes assigned to one device relative to another device. For the example of FIG. 5, the MBB device 108 is allocated two CDM codes ($C_0$ and $C_1$) while the NB device (MTC device) 110 is provided with one CDM code (C2) since the NB device 110 requires a relatively lower data rate than MBB device 108. The receiver of the MBB device combines the data from the two data streams coded with $C_0$ and $C_1$. The code lengths of all of the codes are same for the example.

The NB data symbols are overlaid on the MBB data using either time division multiplexing (TDM) or frequency division multiplexing (FDM). FIG. 6A is a block diagram of the data layered signal 600 using CDM where the NB data is overlaid on the MBB data using time division multiplexing (TDM). Accordingly, the transmission of FIG. 6A is an example of the data layered signal where the data layering is performed using CDM/TDM. The transmission 600 includes a MBB control portion 602 such as a physical downlink control channel (PDCCH) and a MBB data portion 604 such as physical downlink shared channel (PDSCH). The MBB data portion 604 includes the MBB data 114 and the NB data 116 where the NB data 116 is overlaid on the MBB data 114 using CDM.

FIG. 6B block diagram of a data layered signal 610 using CDM where the NB data is overlaid on the MBB data using frequency division multiplexing (FDM). Accordingly, the transmission of FIG. 6B is an example of the data layered signal where the data layered is performed using CDM/FDM. Therefore, the NB data symbols are either CDM/TDM or CDM/FDM overlaid on the MBB data symbols which is part of a larger resource allocation for the MBB data transmission. Generally, the NB transmissions have a relatively very small amount of data with a relatively large control signaling overhead.

Figure 7:
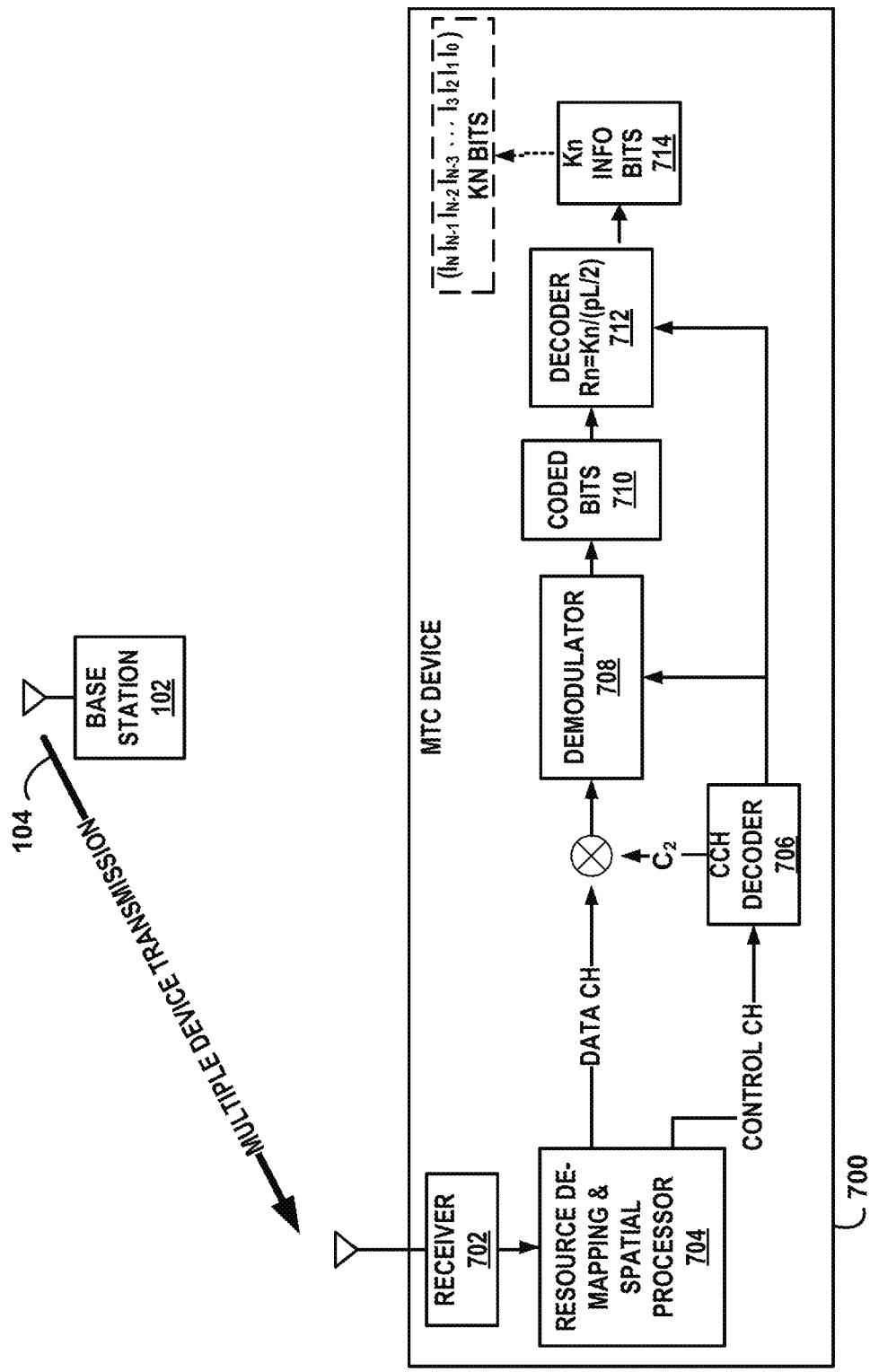
FIG. 7 is a block diagram of a UE device for an example where the layered data signal is a layered using CDM.

FIG. 7 is a block diagram of a UE device 700 for an example where the layered data signal is a layered using CDM. For the example of FIG. 7, only a single CDM code is used to de-scramble or de-spread the demodulated signal. As a result, FIG. 7 is an example of the NB UE device 110 for the implementation shown in FIG. 5. The techniques discussed may be applied to other UE devices and more than one CDM code may be used. The various functions and operations of the blocks described with reference to the UE device 700 may be implemented in any number of devices, circuits, electronics, code, or elements. Two or more of the functional blocks may be integrated in a single device, and the functions described as performed in any single block may be implemented over several devices. For example, the functions of the receiver 702, the demodulator 706 as well as other spatial processing and de-mapping functions 704 may be performed by a single receiver apparatus in some circumstances.

The receiver 702 receives the data layered signal 104 from the base station 101 (200). A resource de-mapping and spatial processor 304 performs MIMO and spatial parameters to de-map and spatially process the signal as discussed above. The control channel information including the control information is decoded by a control channel decoder 706 and the data channel portion of the signal is de-spread and then demodulated by the demodulator 708. For the example a PDCCH carrying the DL control information (DCI) is decoded by both the MBB device to obtain the scheduling assignments and the MPDCCH (or NPDCCH) is decoded by the NB device 110.

In some circumstances, the CDM code ($C_2$) is configured based on hashing of the identification (ID) of the NB (MTC)

device to one of 32 or 64 CDM codes. For example, where the MTC ID is known to the base station 101, the MTC device can apply its ID to determine which of the CDM codes is being used for the MTC data. Therefore, as an alternative, to the CCH decoder 706 determining the CDM code ($C_2$) from the control information, the CDM code can be selected based on the MTC ID.

The control channel decoder 706 determines the contents of the control message regarding modulation order and the data layering parameters located within the data layering information fields associated with and assigned to the UE device 700. The data layering control information fields include the CDM code ($C_2$) for de-spreading the incoming signal. The demodulator 708 applies the modulation order parameters determined by the control channel decoder to generate the sequence of coded bits 710 that includes the coded bits 512. In accordance with the control information retrieved by the control channel decoder 706, the decoder 712 recovers the MTC data directed to the UE device 700. In some situations, the data layering information is not transmitted and the devices determine the information based on which parameters result in successful reception of the data and continue to use those parameters.

Figure 8:
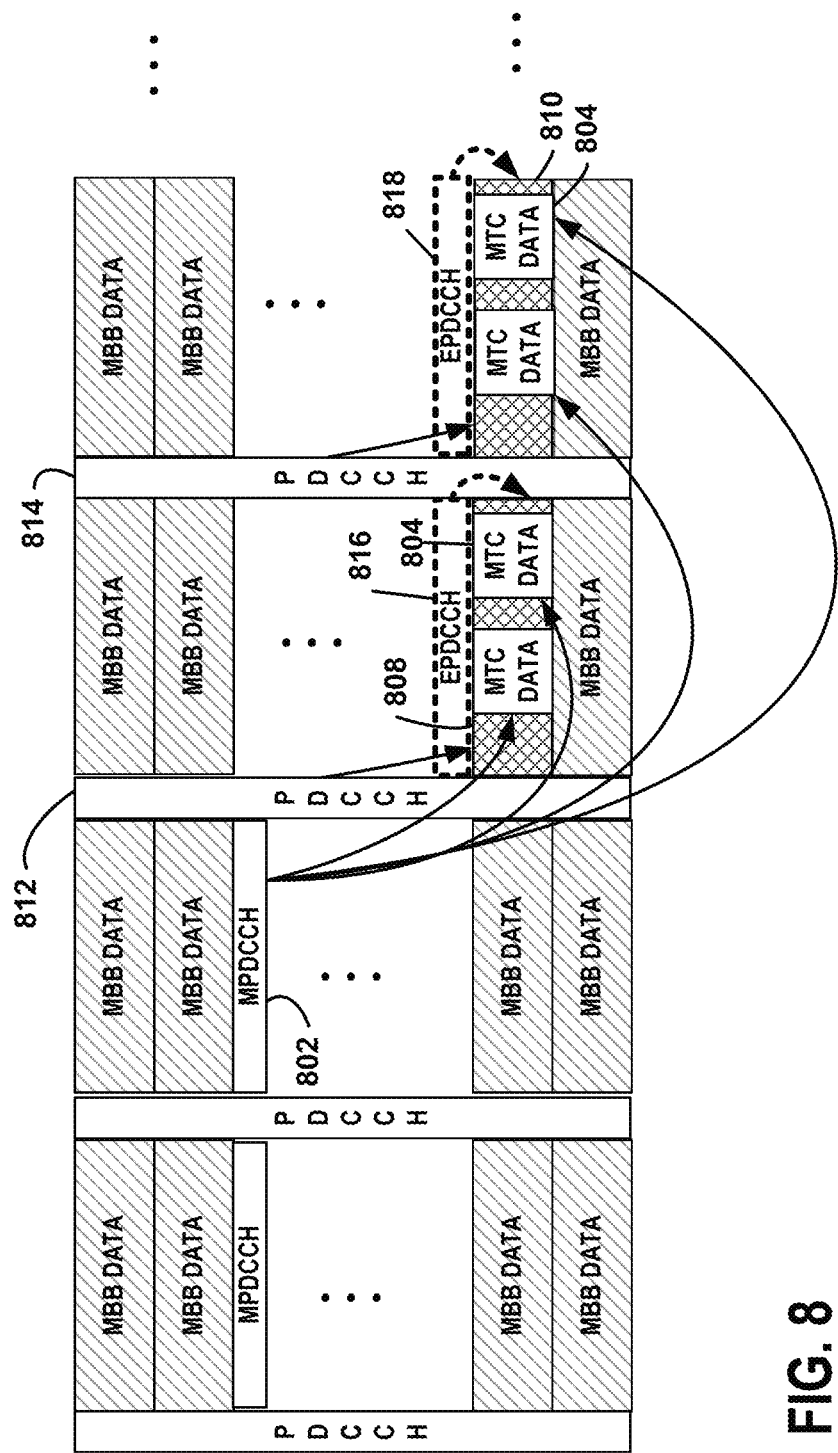
FIG. 8 is a block diagram of control channels and data channels for an example where the NB device is an MTC device and receives control information over the MTC PDCCH (MPDCCH).

FIG. 8 is a block diagram of control channels and data channels for an example where the NB device 110 is an MTC device and receives control information over the MTC PDCCH (MPDCCH) 802. For the example, the transmissions are in accordance with at least one revision of the 3GPP communication specification defining a MPDCCH control channel that includes fewer subcarriers than the PDCCH used for MBB devices. The MPDCCH 802 includes control information for the MTC device indicating at least the set of time frequency resources where the MTC data 804, 806 can be found. The MTC data 804, 806 is within the MBB downlink data channel such as the PDSCH and is repeated at the same channel location. MBB data 808, 810 for the MBB UE device 108 is conveyed on the same set of communication resources although, for the example, only some of the set of communication resources are used for MTC data. As discussed above, the MTC data may be "punctured" into the MBB data 808, 810 and applied only to communication resources not used for MBB data or may be overlaid on the same communication resources using layered modulation or CDM. The control information in the PDCCH 812 allows the MBB device 108 to receive the MBB data 808 and the control information in the PDCCH 814 allows the MBB device to receive the MBB data 810. In some cases, the control information is transmitted in the EPDCCH (not shown in the figure) instead of the PDCCH. The control information in the MPDCCH and the PDCCH 812 is the same and includes time-frequency and spatial parameters. Examples of parameters include MCS, RV, NDI, Hybrid-HARQ parameters, data location in the signal, and MIMO and Transmission Mode parameters needed for spatial processing.

In some situations, an enhanced-PDCCH (EPDCCH) channel can be used to transmit the control information to the MBB device 110. A first EPDCCH 816 and a second EPDCCH are illustrated in dashed lines to indicate that the EPDCCH can be used as an alternative to, or in addition to, the PDCCH Where the EPDCCH is used, the first EPDCCH 816 includes control information associated with the MBB data 808 and the second EPDCCH 818 includes control information associated with the MBB data 810.

Figure 9:
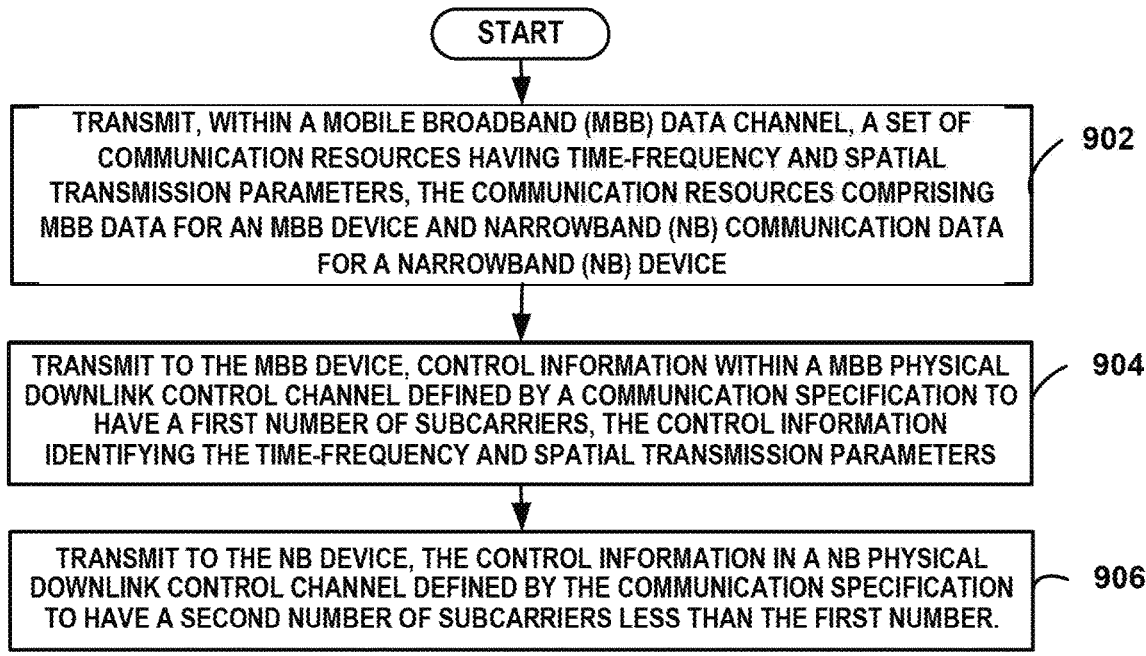
FIG. 9 is a flow chart of an example of a method of transmitting a set of communication resources to a MBB device and a NB device.

FIG. 9 is a flow chart of an example of a method of transmitting a set of communication resources to a MBB device and a NB device. The steps of FIG. 9 can be performed in a different order than shown and some steps may be combined into a single step. Additional steps may be performed and some steps may be omitted. For the example of FIG. 9, the method is performed by a base station operating in accordance with at least one revision of The Third Generation Partnership Project (3GPP) Long Term Evolution (LTE) specification where the MBB downlink control channel is a Physical Downlink Control Channel (PDCCH) defined by the specification and the NB downlink control channel is either a Machine Type Communication Physical Downlink Control Channel (MPDCCH) defined by the specification or an Internet-of-Things Physical Downlink Control Channel (NPDCCH) defined by the specification.

At step 902, a set of communication resources 112 are transmitted within a mobile broadband (MBB) data channel. The set of communication resources 112 have time-frequency and spatial transmission parameters. The set of communication resources include MBB data for an MBB device and narrowband (NB) communication data for a narrowband (NB) device. For the example, the base station transmits the communication resources 112 over the Physical Downlink Shared Channel (PDSCH) defined by the specification.

In some situations, data puncturing techniques are used. As discussed above, unused communication resources within the set communication resources not used for the MBB communication data are used for the NB communication data. In other situations, data layering techniques such as layered modulation and CDM is used to apply the data to the same communication resources at different layers At step 904, control information is transmitted within a MBB physical downlink control channel to the MBB device where the MBB physical downlink control channel is defined by the communication specification to have a first number of subcarriers. The control information identifies the time-frequency and spatial transmission parameters of set of communication resources. For the example, the base station transmits the control information over the PDCCH.

At step 906, the control information is transmitted over a NB physical downlink control channel to the NB device wherein the NB physical downlink control channel is defined by the communication specification to have a second number of subcarriers that is less than the first number. For the example, the base station transmits the control information over the MPDCCH where the NB device is an MTC device and over the NPDCCH where the NB device is a NB-IoT device.

The control information includes geographically dependent control information that is the same for both devices because of their proximity. Examples of such control information include MIMO and Transmission Mode parameters needed for spatial processing.

Figure 10:
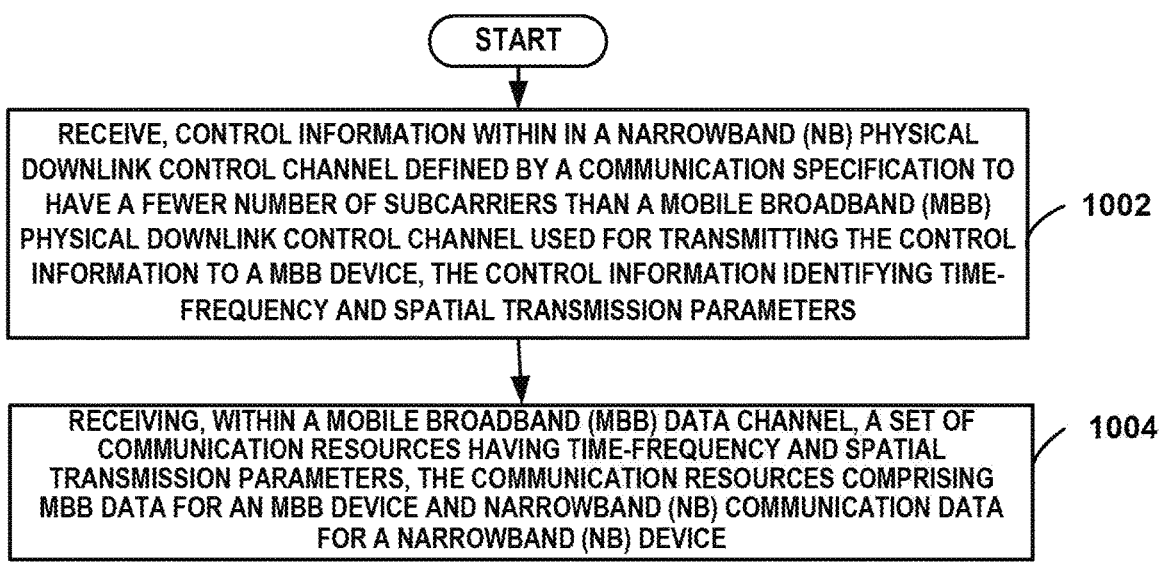
FIG. 10 is a flow chart of an example of a method of receiving a set of communication resources at a NB device.

FIG. 10 is a flow chart of an example of a method of receiving a set of communication resources at a NB device. The steps of FIG. 10 can be performed in a different order than shown and some steps may be combined into a single step. Additional steps may be performed and some steps may be omitted. For the example of FIG. 10, the method is performed by a NB device, such as MTC device or NB-IoT device, operating in accordance with at least one revision of The Third Generation Partnership Project (3GPP) Long Term Evolution (LTE) specification where the MBB downlink control channel is a Physical Downlink Control Channel (PDCCH) defined by the specification and the NB downlink control channel is either a Machine Type Communication Physical Downlink Control Channel (MPDCCH) defined by the specification or an Internet-of-Things Physical Downlink Control Channel (NPDCCH) defined by the specification.

At step 1002, control information is received at the NB device where the control information is transmitted within in a NB physical downlink control channel defined by a communication specification to have a fewer number of subcarriers than a MBB physical downlink control channel used for transmitting the control information to the MBB device. The control information identifies time-frequency and spatial transmission parameters.

At step 1004, a set of communication resources are received within a mobile broadband (MBB) data channel. The set of communication resources have time-frequency and spatial transmission parameters and comprise MBB data for an MBB device and narrowband (NB) communication data for the narrowband (NB) device. The NB device applies the control information to receive the NB data.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
  transmitting, within a mobile broadband (MBB) data channel, a set of communication resources having time-frequency and spatial transmission parameters, the communication resources comprising MBB data for an MBB device and narrowband (NB) communication data for a narrowband (NB) device;
  transmitting, to the MBB device, control information within a MBB physical downlink control channel defined by a communication specification to have a first number of subcarriers, the control information identifying the time-frequency and spatial transmission parameters; and
  transmitting to the NB device, the control information in a NB physical downlink control channel defined by the communication specification to have a second number of subcarriers less than the first number, the control information transmitted within the NB physical downlink control channel being the same as the control information transmitted within the MBB physical downlink control channel.

2. The method of claim 1, wherein the communication specification is a revision of Third Generation Partnership Project (3GPP) Long Term Evolution (LTE) specification and wherein MBB downlink control channel is a Physical Downlink Control Channel (PDCCH) defined by the specification and the NB downlink control channel is one of a Machine Type Communication Physical Downlink Control Channel (MPDCCH) defined by the specification and Internet-of-Things Physical Downlink Control Channel (NPDCCH) defined by the specification.

3. The method of claim 2, wherein the MBB data channel is a Physical Downlink Shared Channel (PDSCH) defined by the specification.

4. The method of claim 3, wherein unused communication resources within the set of communication resources not used for the MBB communication data are used for the NB communication data.

5. The method of claim 3, wherein at least some of the set of communication resources are used for the MBB communication data and the NB communication data.

6. The method of claim 5, further comprising:
  applying data layering modulation to the MBB communication data and the NB communication data to position the MBB communication data on a first data layer of shared communication resources and position the NB communication data on a second data layer of the shared communication resources.

7. The method of claim 5, further comprising:
  applying Code Division Multiplexing (CDM) to the MBB communication data and the NB communication data to position the MBB communication data on a first coded data layer of shared communication resources and position the NB communication data on a second coded data layer of the shared communication resources.

8. The method of claim 3, wherein the control information comprises:
  data location information indicating where the set of communication resources are located within PDSCH.

9. The method of claim 8, wherein the control information comprises:
  multiple input multiple output (MIMO) parameters.

10. A method comprising:
  receiving, control information within a narrowband (NB) physical downlink control channel defined by a communication specification to have a fewer number of subcarriers than a mobile broadband (MBB) physical downlink control channel used for transmitting the control information to a MBB device, the control information identifying time-frequency and spatial transmission parameters, the control information transmitted within the NB physical downlink control channel being the same as the control information transmitted within the MBB physical downlink control channel;
  receiving, within a mobile broadband (MBB) data channel, a set of communication resources having time-frequency and spatial transmission parameters, the communication resources comprising MBB data for an MBB device and narrowband (NB) communication data for a narrowband (NB) device; and
  retrieving the NB data at least partially by applying the time frequency and spatial parameters.

11. The method of claim 10, wherein the communication specification is a revision of Third Generation Partnership Project (3GPP) Long Term Evolution (LTE) specification and wherein MBB downlink control channel is a Physical Downlink Control Channel (PDCCH) defined by the specification and the NB downlink control channel is one of a Machine Type Communication Physical Downlink Control Channel (MPDCCH) defined by the specification and Internet-of-Things Physical Downlink Control Channel (NPDCCH) defined by the specification.

12. The method of claim 11, wherein the MBB data channel is a Physical Downlink Shared Channel (PDSCH) defined by the specification.

13. The method of claim 12, wherein unused communication resources within the set communication resources not used for the MBB communication data are used for the NB communication data.

14. The method of claim 12, wherein at least some of the set of communication resources are used for the MBB communication data and the NB communication data.

15. The method of claim 14, wherein layered modulation is applied to the MBB communication data and the NB communication data to position the MBB communication data on a first data layer of shared communication resources and position the NB communication data on a second data layer of the shared communication resources.

16. The method of claim 14, wherein Code Division Multiplexing (CDM) is applied to the MBB communication data and the NB communication data to position the MBB communication data on a first coded data layer of shared communication resources and position the NB communication data on a second coded data layer of the shared communication resources.

17. The method of claim 10, wherein the control information comprises:
multiple input multiple output (MIMO) parameters.

18. A narrowband (NB) mobile wireless communication device comprising:
a receiver configured to receive control information within a narrowband (NB) physical downlink control channel and to receive, within a mobile broadband (MBB) data channel, a set of communication resources having time-frequency and spatial transmission parameters, the NB physical downlink control channel defined by a communication specification to have a fewer number of subcarriers than a MBB physical downlink control channel used for transmitting the control information to a MBB device, the control information identifying the time-frequency and spatial transmission parameters, the communication resources comprising MBB data for an MBB device and NB communication data for the NB mobile wireless communication device, the control information transmitted within the NB physical downlink control channel being the same as the control information transmitted within the MBB physical downlink control channel; and
a decoder configured to retrieve the NB data at least partially by applying the time frequency and spatial parameters to the set of communication resources.

19. The NB mobile wireless communication device of claim 18, wherein unused communication resources within the set communication resources not used for the MBB communication data are used for the NB communication data.

20. The NB mobile wireless communication device of claim 18, wherein layered modulation is applied to the MBB communication data and the NB communication data to position the MBB communication data on a first data layer of shared communication resources and position the NB communication data on a second data layer of the shared communication resources.

* * * * *